(12) United States Patent
Sakata et al.

(10) Patent No.: US 9,741,190 B2
(45) Date of Patent: Aug. 22, 2017

(54) PUBLIC SERVICE MANAGEMENT METHOD, PUBLIC SERVICE MANAGEMENT APPARATUS, AND PUBLIC SERVICE MANAGEMENT PROGRAMS FOR PROPERLY PROVIDING PUBLIC SERVICES

(71) Applicant: Panasonic Intellectual Property Management Co., Ltd., Osaka (JP)

(72) Inventors: Kotaro Sakata, Tokyo (JP); Yasushi Sugiyama, Tokyo (JP); Kimio Minami, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 52 days.

(21) Appl. No.: 14/886,772

(22) Filed: Oct. 19, 2015

(65) Prior Publication Data
US 2016/0133076 A1    May 12, 2016

(30) Foreign Application Priority Data
Nov. 10, 2014   (JP) ................................ 2014-228039

(51) Int. Cl.
*G07C 11/00*   (2006.01)
*H04L 29/08*   (2006.01)
*G06Q 30/02*   (2012.01)

(52) U.S. Cl.
CPC ............. *G07C 11/00* (2013.01); *G06Q 30/02* (2013.01); *H04L 67/10* (2013.01); *H04L 67/22* (2013.01); *H04L 67/24* (2013.01); *H04L 67/26* (2013.01)

(58) Field of Classification Search
CPC . G07C 11/00; G07C 2011/04; G07C 2011/02; H04L 67/10; H04L 67/22; H04L 67/24; H04L 67/26; G06Q 30/02; G06Q 10/02; G06Q 10/06
See application file for complete search history.

(56) References Cited

U.S. PATENT DOCUMENTS

| | | | | |
|---|---|---|---|---|
| 2002/0002470 A1* | 1/2002 | Arai | ................... | G06Q 30/0283 705/400 |
| 2007/0133603 A1* | 6/2007 | Weaver | ............... | H04L 43/0882 370/468 |
| 2008/0102853 A1* | 5/2008 | Kagimoto | ............. | H04W 28/02 455/453 |
| 2009/0063205 A1* | 3/2009 | Shibasaki | ............... | G06Q 10/02 705/5 |
| 2012/0327893 A1* | 12/2012 | Yuan | ..................... | H04W 24/10 370/329 |
| 2016/0050261 A1* | 2/2016 | McDaid | ................. | H04L 67/10 709/204 |

FOREIGN PATENT DOCUMENTS

JP   11-296589   10/1999

* cited by examiner

*Primary Examiner* — Thomas Alunkal (57) ABSTRACT

There is a need to effectively determine which users should be given priority for using a public service. A way of improving the public service can be to acquire information on congestion degree in use of the public service, to determine whether the congestion degree is higher than a specified level or not, and to transmit information that urges cease of the use of the public service being used to users who have higher utilization of the public service than other users among a plurality of users if the congestion degree is higher than the specified level.

11 Claims, 12 Drawing Sheets

| ID | USER NAME | ADDRESS | ENTRANCE FLAG | ENJOYMENT POINT | CHARGING START TIME | DESIRE FOR CHARGING | NUMBER OF LENT BOOKS |
|---|---|---|---|---|---|---|---|
| 0001 | USER A | aaaa@xxx.xx.xx | Y | 1050 | 13:30 | — | 0 |
| 0002 | USER B | bbbb@yyy.xx.xx | Y | 3800 | 10:00 | — | 3 |
| 0003 | USER C | cccc@zzz.xx.xx | Y | 1000 | 10:00 | — | 2 |
| 0004 | USER D | dddd@www.xx.xx | — | — | — | — | 1 |
| 0005 | USER E | eeee@vvv.xx.xx | Y | 500 | — | PRESENT | 0 |
| 0006 | USER F | ffff@uuu.xx.xx | Y | 1100 | — | PRESENT | 3 |
| ... | ... | ... | ... | ... | ... | ... | ... |

| SERVICE | CONVERTED POINTS |
|---|---|
| CHARGING IN PUBLIC FACILITY | 100 (PER HOUR) |
| LENDING OF BOOKS IN LIBRARY | 10 (PER BOOK) |
| ... | ... |

PUBLIC SERVICE MANAGEMENT METHOD, PUBLIC SERVICE MANAGEMENT APPARATUS, AND PUBLIC SERVICE MANAGEMENT PROGRAMS FOR PROPERLY PROVIDING PUBLIC SERVICES

BACKGROUND

1. Technical Field

The present disclosure relates to a public service management method, a public service management apparatus, and public service management programs for properly providing public services.

2. Description of the Related Art

There are various types of public services such as service of lending books in libraries and the like, service of lending conference rooms, facilities, and the like in community centers, and waste disposal service that is provided by municipalities. In recent years, public facilities that provide service of charging mobile terminals have been appearing. All people are equally able to enjoy such public services.

Japanese Unexamined Patent Application Publication No. 11-296589 discloses a technology on a service in which waste dumped into trash cans by waste dischargers is collected by a municipality, for instance. In this technology, amount of billing of a waste discharger is increased as quantity of waste discharged by the waste discharger increases, in order that fair share of expense for waste disposal may be ensured.

SUMMARY

In the conventional technology of Japanese Unexamined Patent Application Publication No. 11-296589 described above, however, the amount of billing of only one waste discharger is adjusted. On condition that a plurality of users desire to enjoy a public service in the same time zone, accordingly, the technology does not resolve a problem on which user should be given priority for using the public service.

Overlapping may frequently occur among time zones a plurality of users desire for use of a public service and thus development of a technology that may resolve such a problem as described above while ensuring fairness is demanded.

One non-limiting and exemplary embodiment provides a public service management method, a public service management apparatus, and public service management programs that make it possible to provide a public service while effectively determining which users should be given priority for using the public service.

In one general aspect, the techniques disclosed here feature a computer implemented method including: acquiring, by the computer, information on congestion degree that is information which indicates ratio of number of users who use a facility at present to maximum number of users who can use a public service in the facility; determining whether the congestion degree is higher than a specified level or not; and transmitting, by the computer, information that urges cease of use of the public service being used to users who have higher utilization of the public service than other users among a plurality of users if the congestion degree is higher than the specified level.

According to the disclosure, a public service can be provided while it can effectively be determined which users should be given priority for using the public service.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Hereinbelow, an embodiment of the disclosure will be described in detail with reference to the drawings. The embodiment that will be described below merely offers an example and is not intended to limit the disclosure.

(Overview of Services to be Provided)

Figure 1A:
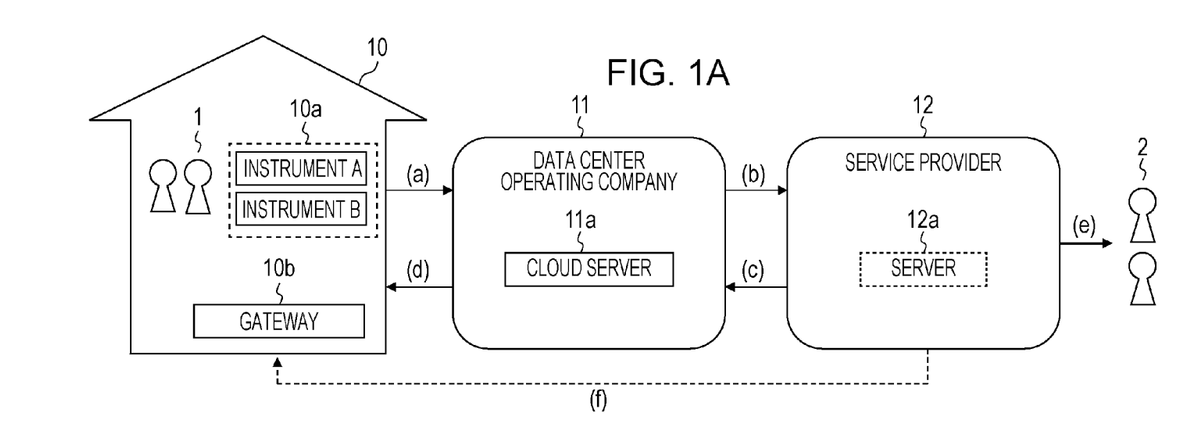
FIG. 1A is a diagram that illustrates an outline of a public service providing system of an embodiment.
Figure 1B:
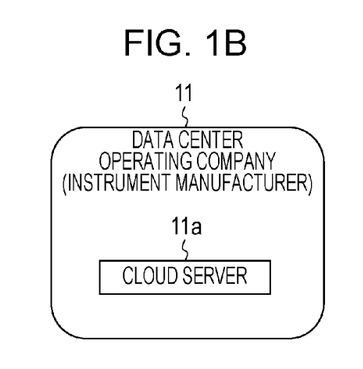
FIG. 1B is a diagram that illustrates a data center operating company in the embodiment.
Figure 1C:
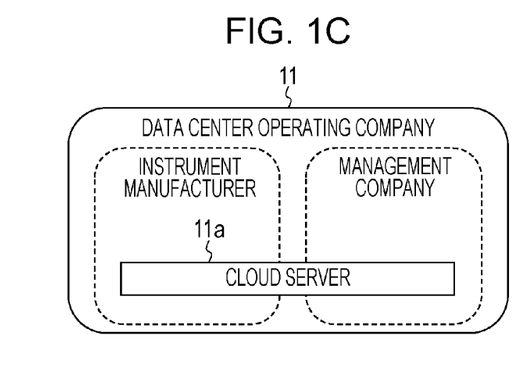
FIG. 1C is a diagram that illustrates the data center operating company which is operated collaboratively in the embodiment.

FIGS. 1A, 1B, and 1C are diagrams that illustrate an outline of a public service management system of the embodiment. FIG. 1A illustrates an overview of the public service management system of the embodiment. A group 10 is a public facility or the like, for instance, a scale of which does not matter. An instrument A and an instrument B that are a plurality of instruments 10a and a gateway 10b exist in the group 10.

Among the plurality of instruments 10a, there are instruments (such as smartphone, PC, and smart power outlet) that can be connected to the Internet and instruments (such as lighting fixture) that cannot be connected to the Internet in themselves. Instruments that cannot be connected to the Internet in themselves but that can be connected to the Internet through the gateway 10b may exist thereamong. In the group 10, there are users 1 who use the plurality of instruments 10a.

A cloud server 11a exists in a data center operating company 11. The cloud server 11a is a virtualized server that cooperates with various instruments through the Internet. The cloud server 11a chiefly manages, for example, huge data (big data) that is difficult to handle by a common database management tool or the like. The data center operating company 11 carries out data management, management of the cloud server 11a, operation of a data center that performs the management, and the like. Services the data center operating company 11 performs will be described later in detail.

Herein, the data center operating company 11 is not limited to a company that performs only the data management, operation of the cloud server 11a, and the like. On condition that an instrument manufacturer which develops and produces one of the plurality of instruments 10a additionally carries out the data management, the management of the cloud server 11a, and the like, for instance, the instrument manufacturer is equivalent to the data center operating company 11 (FIG. 1B).

The data center operating company 11 is not limited to one company. On condition that an instrument manufacturer and another management company carry out the data management, the operation of the cloud server 11a, and the like in cooperation with each other or share the data management, the operation of the cloud server 11a, and the like, for instance, both or either of them is equivalent to the data center operating company 11 (FIG. 1C).

A service provider 12 possesses a server 12a. The server 12a, a scale of which does not matter, may be a memory in a PC for personal use, for instance. In some cases, the service provider 12 does not possess the server 12a.

In the service described above, the gateway 10b is not indispensable. On condition that the cloud server 11a manages all data, for instance, the gateway 10b is unnecessary. There may be cases where the instruments that cannot be connected to the Internet in themselves do not exist, as in a case where all instruments in the public facility are connected to the Internet.

Subsequently, flow of information in the service will be described. Initially, the instrument A or the instrument B in the group 10 transmits log information to the cloud server 11a in the data center operating company 11. The cloud server 11a accumulates therein the log information from the instrument A or the instrument B ((a) of FIG. 1A).

The log information is information that indicates situation, date and time, and the like of operation of the plurality of instruments 10a, for instance. The log information is information that indicates situation, date and time, and the like of operation of smartphones, PCs, smart power outlets, and the like, for instance. The log information, however, is not limited thereto and encompasses all information that can be acquired from all the instruments.

The log information may directly be provided from the plurality of instruments 10a through the Internet to the cloud server 11a. The log information may be accumulated from the plurality of instruments 10a in the gateway 10b for the present and may be provided from the gateway 10b to the cloud server 11a.

Subsequently, the cloud server 11a in the data center operating company 11 provides the accumulated log information in fixed units to the service provider 12. The unit may be a unit in which the information accumulated by the data center operating company 11 may be sorted and provided for the service provider 12 or may be a unit requested by the service provider 12. Though described as being fixed, the units do not have to be fixed. Amount of the information to be provided may vary depending on circumstances.

The log information is saved in the server 12a possessed by the service provider 12 as required ((b) of FIG. 1A). The service provider 12 sorts the log information into information suitable for the service that is provided for users and provides the information for the users. The users for whom the information is provided may be the users 1 who use the plurality of instruments 10a or may be outside users 2.

The information may be provided for the users directly from the service provider 12, for instance ((f) and (e) of FIG. 1A) and/or may be provided for the users via the cloud server 11a in the data center operating company 11 again, for instance ((c) and (d) of FIG. 1A). The cloud server 11a in the data center operating company 11 may sort the log information into the information suitable for the service that is provided for the users and may provide the information for the service provider 12.

The users 1 and the users 2 may be different or may be the same.

Hereinbelow, the embodiment of the disclosure will be described in detail.

In the embodiment that will be described, the public service is a service of charging terminal devices such as smartphones in a library. The public service in the disclosure is not limited thereto and may be another service such as a service of lending conference rooms, facilities, and the like in a community center.

Figure 2:
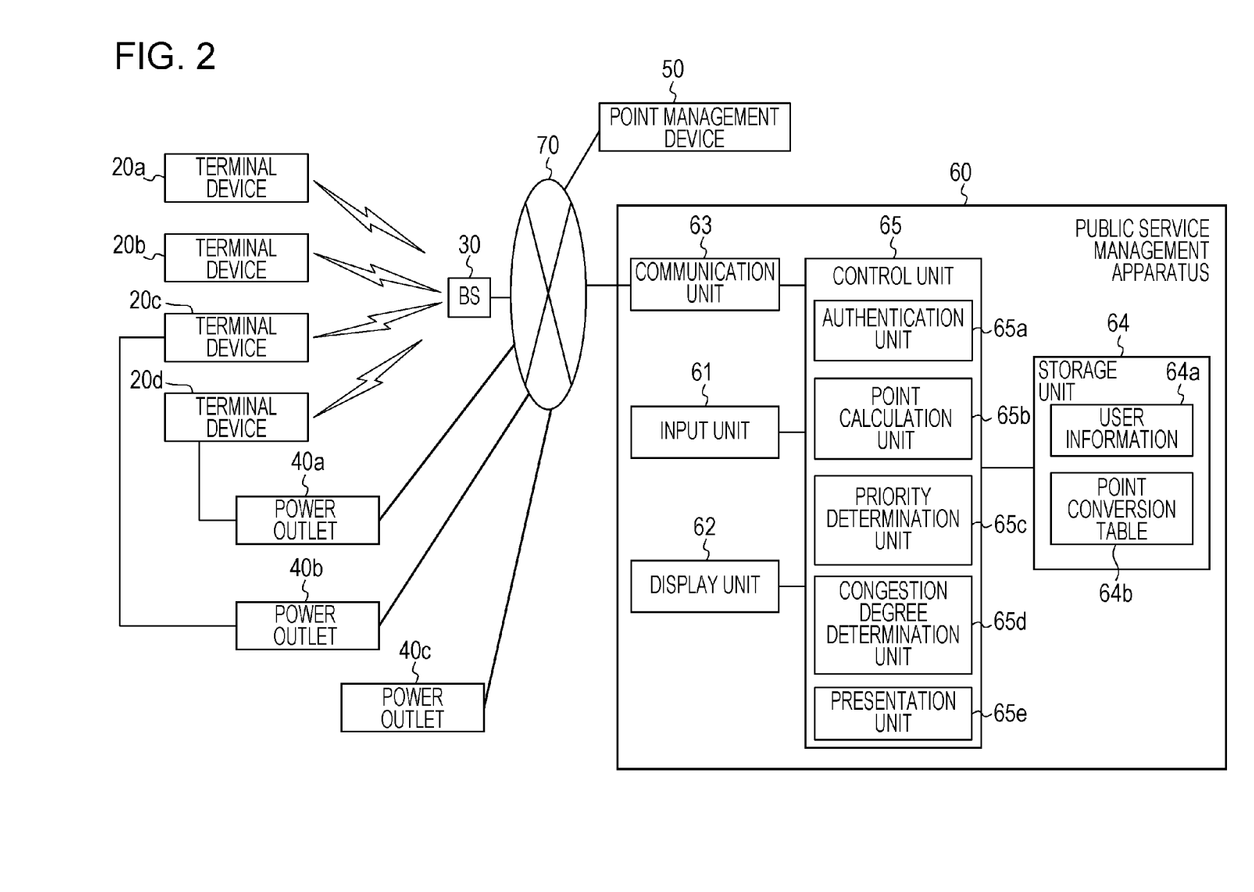
FIG. 2 is a block diagram that illustrates an example of a configuration of a public service management system in the embodiment of the disclosure.

FIG. 2 is a block diagram that illustrates an example of a configuration of the public service management system according to the embodiment of the disclosure. In the public service management system, as illustrated in FIG. 2, terminal devices 20a through 20d, a base station device (BS) 30, power outlets 40a through 40c, a point management device 50, and a public service management apparatus 60 are connected through a network 70.

The terminal devices 20a through 20d and the power outlets 40a through 40c correspond to the plurality of instruments 10a described above, the point management device 50 corresponds to the cloud server 11a described above, and the public service management apparatus 60 corresponds to the server 12a described above, for instance.

The terminal devices 20a through 20d are terminal devices such as smartphones and PCs. The terminal devices 20a through 20d each communicate with the base station device 30 by radio communication and are connected through the base station device 30 to the network 70.

Though the terminal devices 20a through 20d are connected through the base station device 30 to the network 70 herein, the terminal devices 20a through 20d may be connected through access points (not illustrated) instead of the base station device 30 to the network 70. The terminal devices 20a through 20d may be connected through a wired LAN to the network 70.

When users of the library who have the terminal devices 20a through 20d enter the library, the public service management apparatus 60 carries out authentication processing for the users. Specifically, the terminal devices 20a through 20d each transmit authentication information on the user through the network 70 to the public service management apparatus 60. The authentication processing is not limited thereto and the public service management apparatus 60 for the library may read the authentication information from admission cards or the like possessed by the users, for instance.

The power outlets 40a through 40c are instruments that are provided in the library and that supply power to instruments such as the terminal devices 20a through 20d. In the example of FIG. 2, the terminal devices 20c and 20d are charged through the power outlets 40b and 40a, respectively.

When the users who have the terminal devices 20a and 20b desire to have the terminal devices charged, the users each operate the terminal device 20a, 20b to transmit a charging request through the network 70 to the public service management apparatus 60.

The terminal devices 20c and 20d for which charging is started transmit information on start time of the charging through the network 70 to the public service management apparatus 60. Instead of the terminal devices 20c and 20d for which the charging is started, the power outlets 40b and 40a to which the terminal devices 20c and 20d are connected may transmit the information on the start time of the charging to the public service management apparatus 60.

The point management device 50 is a server device that stores enjoyment points for each user indicating a degree to which the user enjoys the public service. Upon reception of a transmission request from the public service management apparatus 60 for the enjoyment points for a user, the point management device 50 transmits the enjoyment points through the network 70 to the public service management apparatus 60.

The point management device 50 stores information on correspondence relation between various types of public services and converted points for the public services. Upon reception of a transmission request from the public service management apparatus 60 for the information on the converted points, the point management device 50 transmits the information through the network 70 to the public service management apparatus 60.

The public service management apparatus 60 is a server apparatus that manages the public services that are provided for the users. The public service management apparatus 60 includes an input unit 61, a display unit 62, a communication unit 63, a storage unit 64, and a control unit 65.

The input unit 61 is an input device such as a keyboard and a mouse. The display unit 62 is a display device such as a display. The communication unit 63 is a device such as a network interface card that communicates with another device through the network 70.

The storage unit 64 is a storage device such as a memory and a hard disk device. The storage unit 64 stores user information 64a, a point conversion table 64b, and the like.

Figure 3:
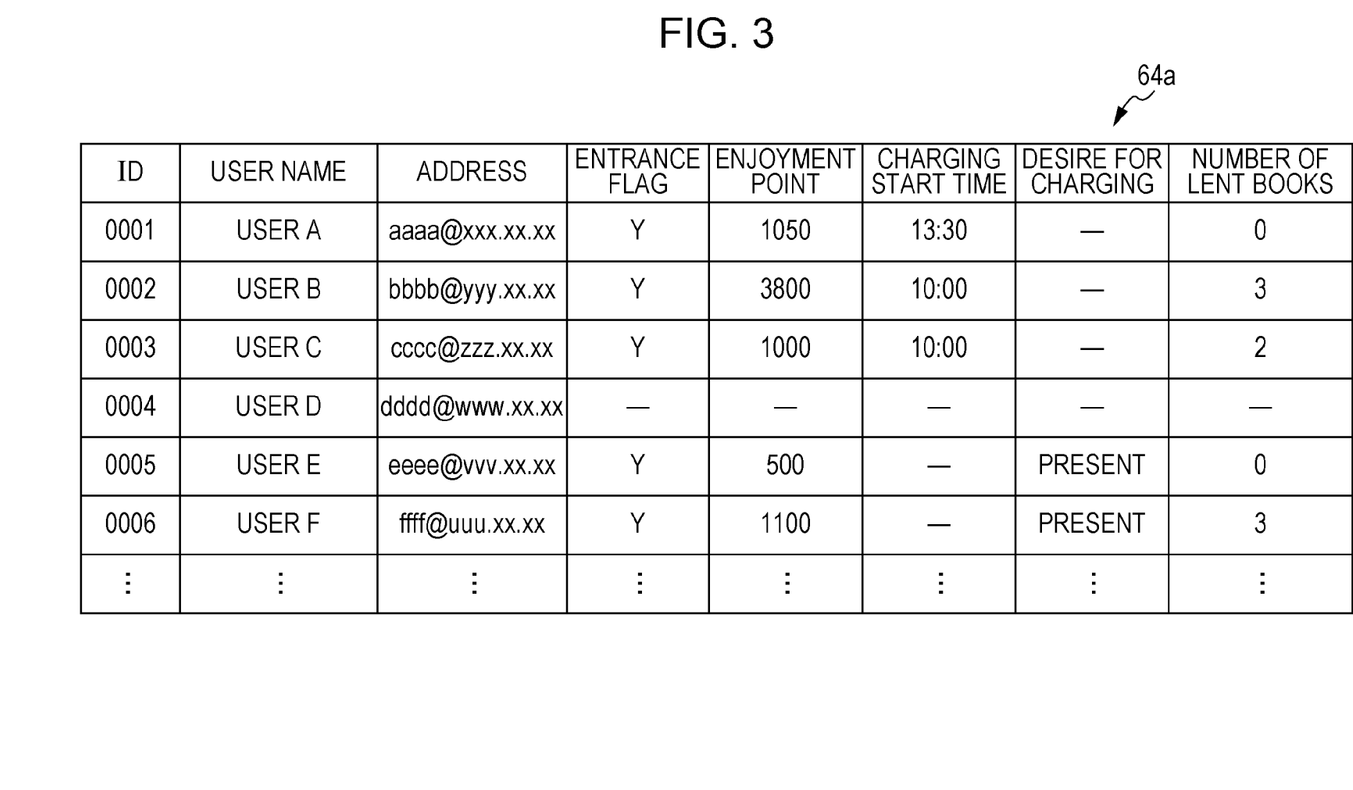
FIG. 3 is a diagram that illustrates an example of user information in the embodiment of the disclosure.

The user information 64a will be described specifically with use of FIG. 3. FIG. 3 is a diagram that illustrates an example of the user information 64a in the embodiment of the disclosure.

As illustrated in FIG. 3, the user information 64a includes information on IDs, names, and addresses of the users, and entrance flags, the enjoyment points, the charging start time, desire for charging, and numbers of lent books for the users.

The information on the IDs, the names, and the addresses of the users is information on identification IDs for identification of the users, the names of the users, and e-mail addresses for the terminal devices 20a through 20d the users have, respectively. The information is registered in advance in the user information 64a by an administrator of the public service management apparatus 60.

The entrance flag is information that indicates whether the user has entered the library or not. When the user is authenticated by the user authentication, the information indicating that the user has entered is registered in the entrance flag. In the example illustrated in FIG. 3, "Y" is registered as the information indicating that the user has entered.

In this configuration, total number of users whose entrance flags are set as "Y" represents total number of users who have been authenticated by the user authentication (total number of users who use the library at present).

The enjoyment points represent information that is the same as information on the enjoyment points stored in the point management device 50 described above. Specifically, the information on the enjoyment points of the users that has been transmitted from the point management device 50 is registered as the information on the enjoyment points.

The charging start time is information on the start time of the charging for the terminal devices 20c and 20d. Based on presence or absence of the information on the charging start time, it is determined whether a user is using the charging service or not.

The information on the charging start time is transmitted from the terminal devices 20c and 20d for which the charging has been started to the public service management apparatus 60. The power outlets 40b and 40a to which the terminal devices 20c and 20d are connected may transmit the information on the charging start time to the public service management apparatus 60.

The desire for charging is information that indicates whether the users desire the charging or not. The desire for charging is registered when the users who have the terminal devices 20a and 20b desire to have the terminal devices 20a, 20b charged and when the users each operate the terminal device 20a, 20b to transmit the charging request to the public service management apparatus 60. In the example illustrated in FIG. 3, users E and F desire the charging.

The number of lent books is information on the number of books the library has lent to each user. The number of lent books is updated each time books are lent to the users.

Figure 4:
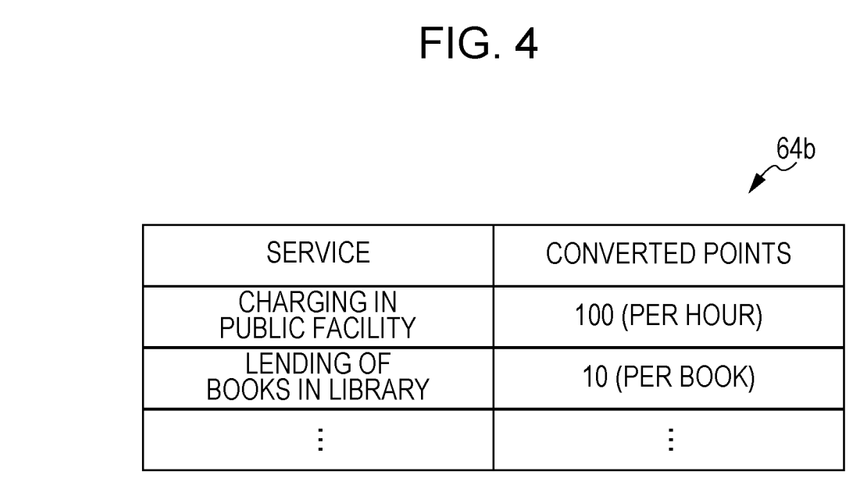
FIG. 4 is a diagram that illustrates an example of a point conversion table in the embodiment of the disclosure.

Subsequently, the point conversion table 64b will be described with use of FIG. 4. FIG. 4 is a diagram that illustrates an example of the point conversion table 64b in the embodiment of the disclosure.

The point conversion table 64b is a table that shows the correspondence relation between the types of services which are provided for users in the library and the converted points which correspond to the services. In the example illustrated in FIG. 4, information on the converted points of 100 (per hour) and 10 (per book) is associated with the service of the charging in the public facility and service of lending of books in the library, respectively.

As described above, the point management device 50 stores the information on the converted points for the various public services. The information on the services and the converted points which are registered in the point conversion table 64b is acquired from the point management device 50 for the services which relate to the library.

Referring to FIG. 2 again, the control unit 65 includes an authentication unit 65a, a point calculation unit 65b, a priority determination unit 65c, a congestion degree determination unit 65d, and a presentation unit 65e.

The authentication unit 65a carries out the authentication processing for users who enter the library. Specifically, the authentication unit 65a receives the authentication information on the users from the terminal devices 20a through 20d through the network 70 and thereby carries out the authentication processing for the users.

The point calculation unit 65b calculates the enjoyment points for the users in accordance with the public services the users enjoy in the library. Specifically, the point calculation unit 65b receives the information on the enjoyment points for the users from the point management device 50 and registers the received information on the enjoyment points in the user information 64a.

The point calculation unit 65b updates the enjoyment points in the user information 64a by converting the public services the users enjoy in the library into the points based on the point conversion table 64b and adding the converted points to the enjoyment points registered in the user information 64a.

The priority determination unit 65c determines priority among the users. The lower the enjoyment points, the higher the priority. Specifically, the priority determination unit 65c refers to the user information 64a and determines users for whom the desire for charging is "PRESENT" and users who have the lower enjoyment points among the users who are using the charging as users who have the higher priority.

The congestion degree determination unit 65d determines a congestion degree in use of a public service based on information on number of users who desire to use the public service. The congestion degree is information that indicates ratio of number of users who use the facility at present to maximum number of users who can use the facility. For the user information 64a illustrated in FIG. 3, the congestion degree determination unit 65d calculates total number of users for whom the desire for charging is "PRESENT" as the information on the number of the waiting users who desire to use the public service.

The congestion degree determination unit 65d determines that the congestion degree is high when the total number exceeds a specified value or determines that the congestion degree is low when the total number does not exceed the specified value.

When it is determined that the congestion degree is high, the presentation unit 65e transmits information that urges cease of enjoyment of the public service to users with low priority and presents information that urges use of the public service to the users with high priority. A specific method of presenting the information will be described later.

Figure 5:
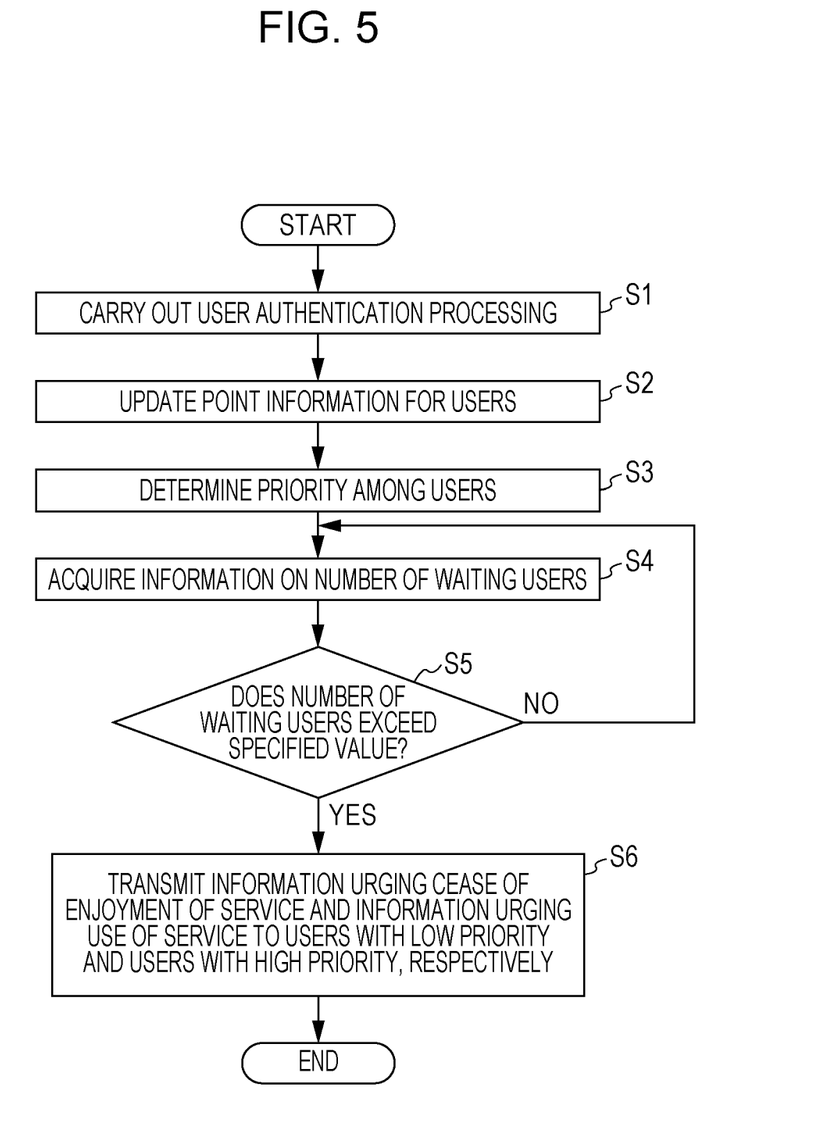
FIG. 5 is a flow chart that illustrates a processing procedure for public service providing processing in the embodiment of the disclosure.

Subsequently, an example of a processing procedure for public service providing processing in the embodiment of the disclosure will be described. FIG. 5 is a flow chart that illustrates the processing procedure for the public service providing processing in the embodiment of the disclosure.

Initially, the authentication unit 65a in the public service management apparatus 60 carries out the authentication processing for users who enter the library (step S1). Specifically, the authentication unit 65a receives the authentication information on the users that is transmitted from the terminal devices 20a through 20d and thereby carries out the authentication processing for the users.

Subsequently, the point calculation unit 65b updates the enjoyment points included in the user information 64a (step S2).

Specifically, the point calculation unit 65b transmits the transmission request for the enjoyment points for the users identified by the authentication processing to the point management device 50 and registers the enjoyment points transmitted accordingly from the point management device 50 as the enjoyment points in the user information 64a.

When a user enjoys a public service such as the charging service and the service of lending books after entering the library, the point calculation unit 65b converts the enjoyed service into the points based on the point conversion table 64b.

The point calculation unit 65b adds the converted points to the enjoyment points stored in the user information 64a and registers afresh resultant points as the enjoyment points in the user information 64a.

In the example of FIG. 3, for instance, the enjoyment points of a user A is 1050 points and the charging start time for the user A is 13:30. It is assumed that one hour has elapsed since the start of the charging, for instance.

In this case, the point calculation unit 65b converts the charging service the user A has enjoyed into 100 points based on the point conversion table 64b illustrated in FIG. 4. Then the point calculation unit 65b adds 100 points to 1050 points stored in the user information 64a and registers afresh resultant 1150 points as the enjoyment points in the user information 64a.

The point calculation unit 65b periodically updates the enjoyment points in the user information 64a as described above. Upon each periodical update of the enjoyment points, the point calculation unit 65b transmits information on the updated enjoyment points to the point management device 50. The enjoyment points stored in the point management device 50 are updated with use of the information.

Subsequently, the priority determination unit 65c determines the priority among the users (step S3). Specifically, the priority determination unit 65c refers to the user information 64a and determines the users for whom the desire for charging is registered as "PRESENT" and the users who have the lower enjoyment points among the users who are enjoying the charging service as the users who have the higher priority.

In FIG. 3, for instance, the users E and F are the users for whom the desire for charging is registered as "PRESENT" and users A, B, and C are the users who are enjoying the charging service.

Therein, the enjoyment points increase in order of the users E, C, A, F, and B. That is, the priority increases in order of the users B, F, A, C, and E.

Subsequently, the congestion degree determination unit 65d acquires the information on the number of the waiting users who wait for provision of the public service (step S4). Specifically, the congestion degree determination unit 65d acquires the number of the users for whom the desire for charging is registered as "PRESENT" in the user information 64a illustrated in FIG. 3 as the information on the number of the waiting users.

The congestion degree determination unit 65d then determines whether the number of the waiting users exceeds the specified value or not (step S5). If the number of the waiting users is equal to or smaller than the specified value (step S5: NO), processing in step S4 is carried out again after specified time elapses.

If it is determined in step S5 that the number of the waiting users exceeds the predetermined value (step S5: YES), the presentation unit 65e transmits the information that urges the cease of the enjoyment of the service and the information that urges the use of the service to terminal devices the users with low priority have and terminal devices the users with high priority have, respectively, among the terminal devices 20a through 20d (step S6).

Specifically, the presentation unit 65e reads the information on the addresses of the users with low priority and the users with high priority from the user information 64a and transmits the information that urges the cease of the enjoyment of the service and the information that urges the use of the service with use of the addresses. The information is displayed by the terminal devices so as to be presented to the users.

Specifically, the presentation unit 65e transmits the information that urges the cease of the enjoyment of the charging service to terminal devices a specified number of users with low priority among the users enjoying the charging service have.

The presentation unit 65e further transmits the information that urges the use of the charging service to terminal devices a specified number of users with high priority among the users for whom the desire for charging is registered as "PRESENT" have. It is assumed, in description below, that only one user with low priority and only one user with high priority are chosen.

In the example of FIG. 3, as described above, the users E and F are the users for whom the desire for charging is registered as "PRESENT" and the users A, B, and C are the users who are enjoying the charging service. That is, the priority increases in order of the users B, F, A, C, and E.

On this condition, the presentation unit 65e transmits the information that urges the cease of the enjoyment of the charging service to the user B with low priority. The presentation unit 65e further transmits the information that urges the use of the charging service to the user E with high priority.

The presentation unit 65e, however, does not transmit the information that urges the use of the charging to the user F for whom the desire for charging is registered as "PRESENT" because the user F has lower priority than another user.

Figure 6A:
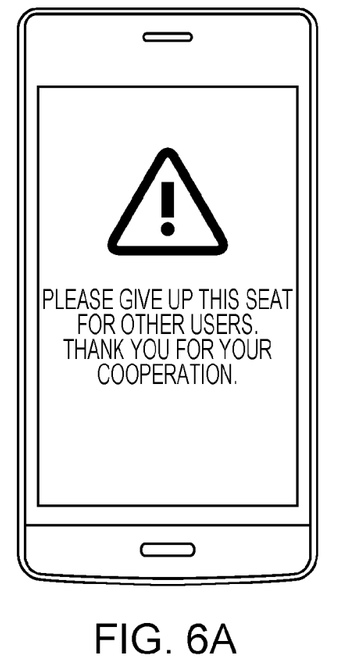
FIG. 6A is a diagram that illustrates an example of presentation of information in the embodiment of the disclosure.
Figure 6B:
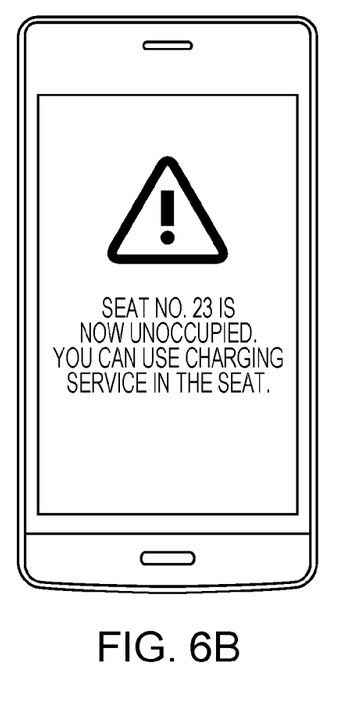
FIG. 6B is a diagram that illustrates an example of presentation of information in the embodiment of the disclosure.
Figure 7:
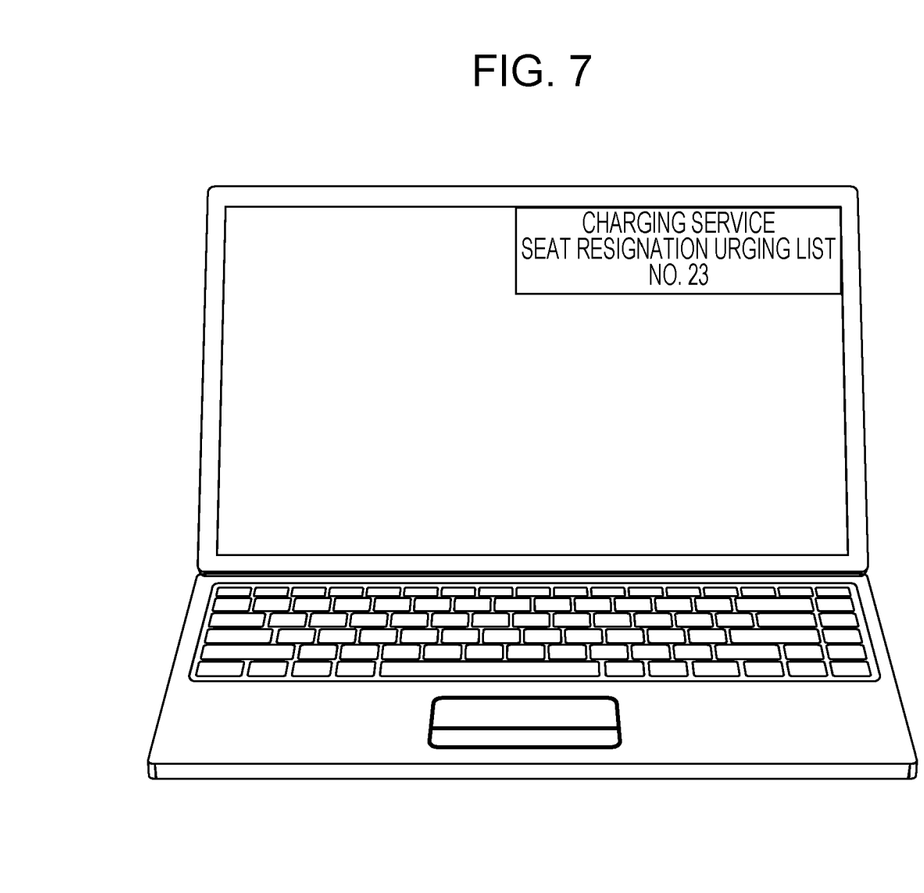
FIG. 7 is a diagram that illustrates another example of presentation of information in the embodiment of the disclosure.

Presentation of the information the presentation unit 65e carries out will be described specifically with use of FIGS. 6A, 6B, and 7. FIGS. 6A and 6B are diagrams that each illustrate an example of the presentation of the information in the embodiment of the disclosure. FIG. 7 is a diagram that illustrates another example of the presentation of the information in the embodiment of the disclosure.

FIG. 6A illustrates an example of the information that urges the cease of the enjoyment of a public service. FIG. 6B illustrates an example of the information that urges the use of the public service.

In the example of FIG. 6B, information on a seat number (No. 23) is included in the information that urges the use of the public service. Such information can be generated on condition that the power outlets 40a through 40c have a function of detecting whether the power outlets 40a through 40c are providing the charging service or not, because a seat number can be identified thereby.

Upon reception from any of the power outlets 40a through 40c of information that provision of the charging service to a user is ended, specifically, the presentation unit 65e determines seat number of a seat where the power outlet among the power outlets 40a through 40c that has transmitted the information is provided, from information on addresses of the power outlets 40a through 40c or the like.

Then the presentation unit 65e generates the information that urges the use of the public service and that includes the information on the seat number and transmits the information to the terminal device. Such information on the seat number may be omitted from the information that urges the use of the public service.

FIG. 7 illustrates an example of the information that urges the cease of the enjoyment of a public service and that is presented to staff of the library. In the example illustrated in FIG. 7, the information is presented as popup on screens of terminal devices (not illustrated) the staff have.

The information also includes the information on the seat number (No. 23) of the seat where a user to be urged to cease the enjoyment of the public service exists. The seat number is determined by the same method as described above. Presentation of such information to the staff makes it possible for the staff to urge the user with low priority to cease the enjoyment of the public service.

Though the presentation unit 65e transmits the information that urges the cease of the enjoyment of the public service to the terminal devices of the specified number of users with low priority in the embodiment, the disclosure is not limited thereto.

For instance, the presentation unit 65e may adjust number of the terminal devices to which the information that urges the cease of the enjoyment of the public service is transmitted, in accordance with the number of the users who wait for start of the use of the public service, so that the charging service may be provided to as many users as possible while the number of the waiting users may be decreased. The number of the waiting users may coincide with or may differ from the number of the terminal devices to which the information that urges the cease of the enjoyment of the public service is transmitted.

Though the point calculation unit 65b converts the public service enjoyed by each user into the points based on the point conversion table 64b in the above embodiment, the point calculation unit 65b may alter the converted points in accordance with the number of the users who wait for the start of the use of the public service.

On condition that the number of the users who wait for the start of the use of the charging service is greater than a specified number, for instance, weighting on the points that are added to the users who are enjoying the charging service at present may be carried out so that more points may be added to the users than on condition that the number of the users who wait for the start of the use is smaller.

By such weighting on the points, concentration of the users on public services in high demand can be lowered.

In the above embodiment, the enjoyment points stored in the point management device 50 and the enjoyment points stored in the point conversion table 64b of the public service management apparatus 60 may be initialized so as to be zero after a specified period (one month, for instance) lapses since first setting of the enjoyment points at zero.

By such initialization of the enjoyment points, a situation can be avoided in which users having enjoyed much public services lastingly remain having low priority.

Though the authentication processing for each user is carried out when the user enters the library in the embodiment, the disclosure is not limited thereto and the authentication processing for the user may be carried out at another point of time.

The embodiment according to the disclosure has been described above in detail with reference to the drawings. Functions of the terminal devices 20a through 20d, the base station device 30, the power outlets 40a through 40c, the point management device 50, and the public service management apparatus 60 that have been described above can be attained by computer programs.

Figure 8:
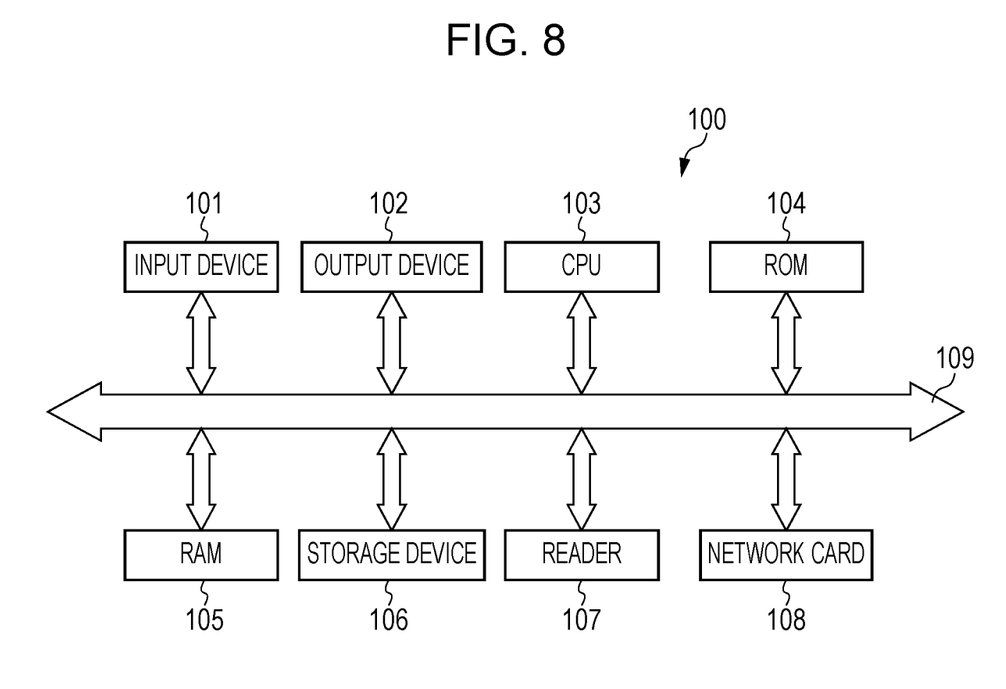
FIG. 8 is a diagram that illustrates a hardware configuration of a computer that attains functions of devices by programs.

FIG. 8 is a diagram that illustrates a hardware configuration of a computer that attains the functions of the devices by programs.

The computer 100 includes an input device 101 such as keyboard, mouse, touch pad, and button, an output device 102 such as display and speaker, a central processing unit (CPU) 103, a read only memory (ROM) 104, a random access memory (RAM) 105, a storage device 106 such as hard disk device and solid state drive (SSD), a reader 107 that reads information from a recording medium such as digital versatile disk read only memory (DVD-ROM) and universal serial bus (USB) memory, and a network card 108 that carries out communication through a network and those elements are connected by a bus 109.

The reader 107 reads the programs for attaining the functions of the devices from the recording medium in which the programs are recorded and stores the programs in the storage device 106. Otherwise, the network card 108 communicates with a server device connected to the network and stores the programs for attaining the functions of the devices that are downloaded from the server device in the storage device 106.

The CPU 103 then copies the programs, stored in the storage device 106, into the RAM 105, sequentially reads instructions included in the programs from the RAM 105, and executes the instructions, so that the functions of the devices are attained.

Technology described for the embodiment can be attained by following types of cloud service, for instance. The types by which the technology described for the embodiment is attained, however, are not limited the following.

(Service Type 1: Company-Owned Data Center Type)

Figure 9:
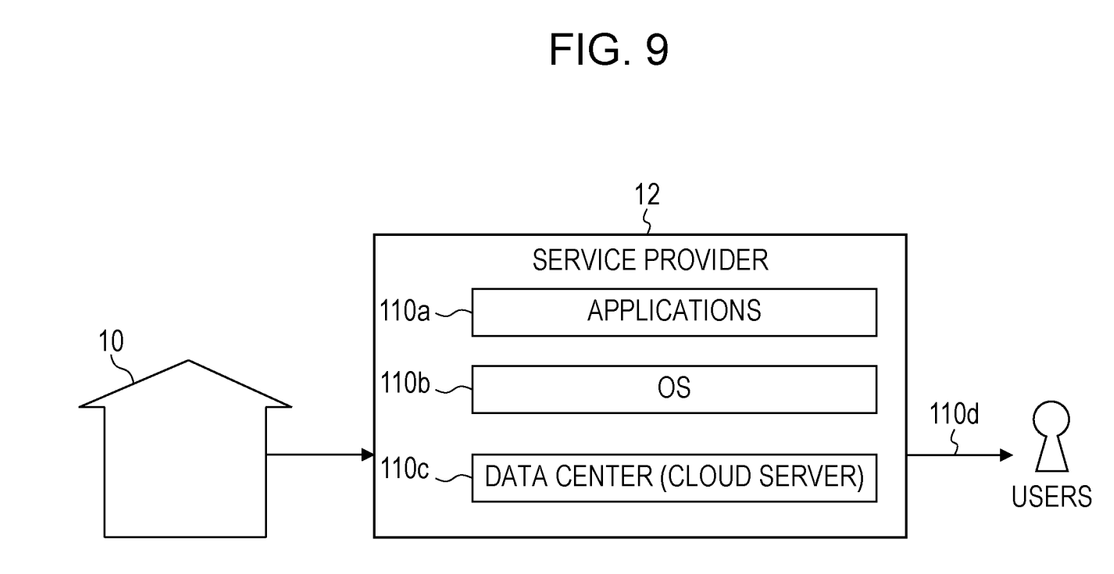
FIG. 9 is a diagram that illustrates a service type 1 (company-owned data center type)

FIG. 9 is a diagram that illustrates a service type 1 (company-owned data center type). In the type, the service provider 12 acquires information from the group 10 and provides services for users. The service provider 12 in the type has a function as the data center operating company 11. That is, the service provider 12 possesses the cloud server 11a that manages big data. Therefore, the data center operating company 11 does not exist.

In the type, the service provider 12 operates and manages the data center (cloud server 11a) (110c). The service provider 12 further manages an OS (110b) and applications (110a). The service provider 12 provides the services with use of the OS (110b) and the applications (110a) that are managed by the service provider 12 (110d).

(Service Type 2: IaaS Using Type)

Figure 10:
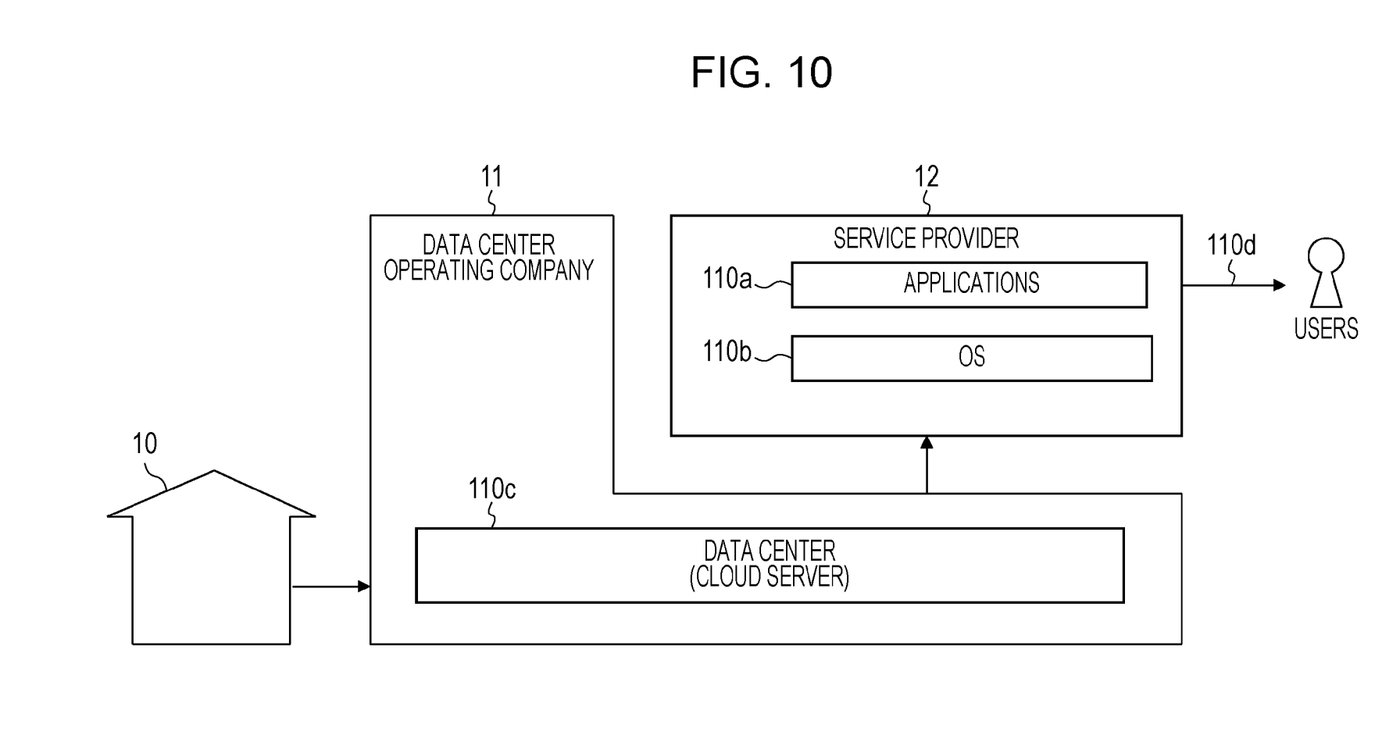
FIG. 10 is a diagram that illustrates a service type 2 (IaaS using type)

FIG. 10 is a diagram that illustrates a service type 2 (IaaS using type). The IaaS is an abbreviation for infrastructure as a service and is a cloud service delivery model in which an infrastructure itself for building and operating a computer system is provided as a service via the Internet.

In the type, the data center operating company 11 operates and manages the data center (cloud server 11a) (110c). The service provider 12 manages the OS (110b) and the applications (110a). The service provider 12 provides the services with use of the OS (110b) and the applications (110a) that are managed by the service provider 12 (110d).

(Service Type 3: PaaS Using Type)

Figure 11:
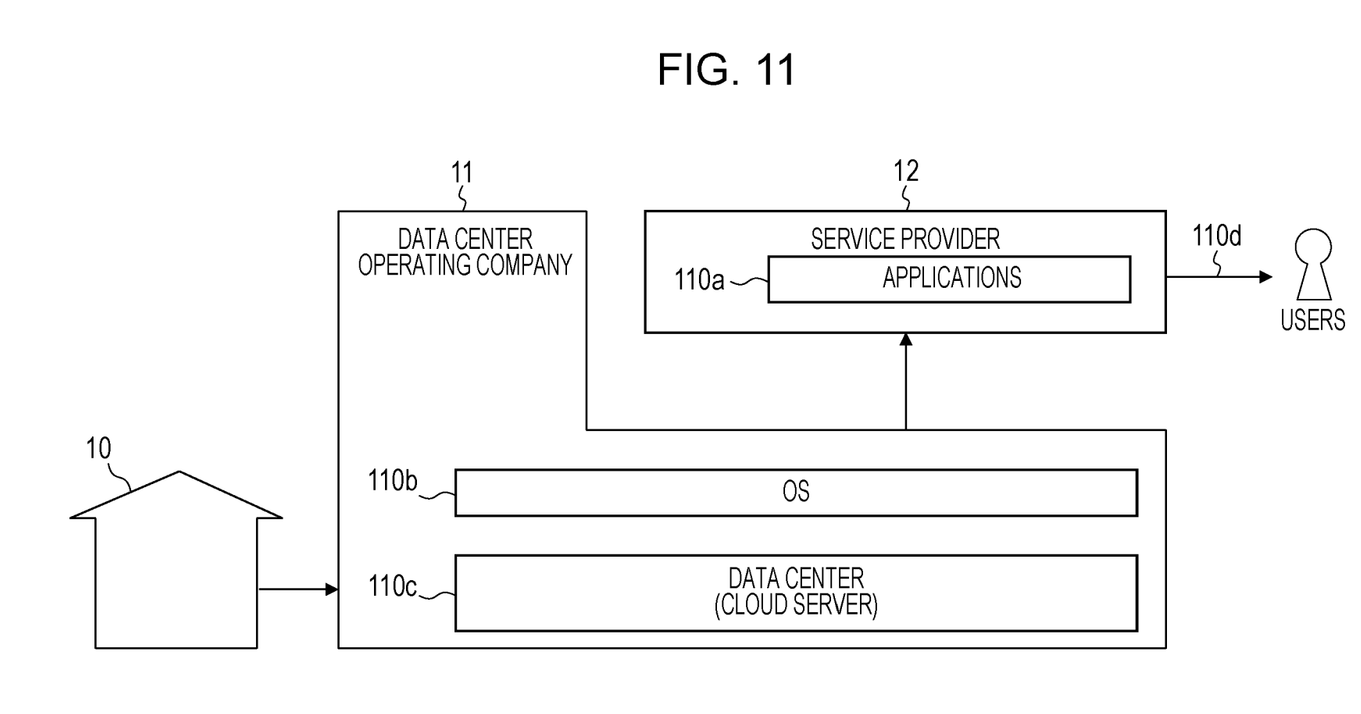
FIG. 11 is a diagram that illustrates a service type 3 (PaaS using type)

FIG. 11 is a diagram that illustrates a service type 3 (PaaS using type). The PaaS is an abbreviation for platform as a service and is a cloud service delivery model in which a platform that forms a base for building and operating software is provided as a service via the Internet.

In the type, the data center operating company 11 manages the OS (110b) and operates and manages the data center (cloud server 11a) (110c). The service provider 12 manages the applications (110a). The service provider 12 provides the services with use of the OS (110b) that is managed by the data center operating company 11 and the applications (110a) that are managed by the service provider 12 (110d).

(Service Type 4: SaaS Using Type)

Figure 12:
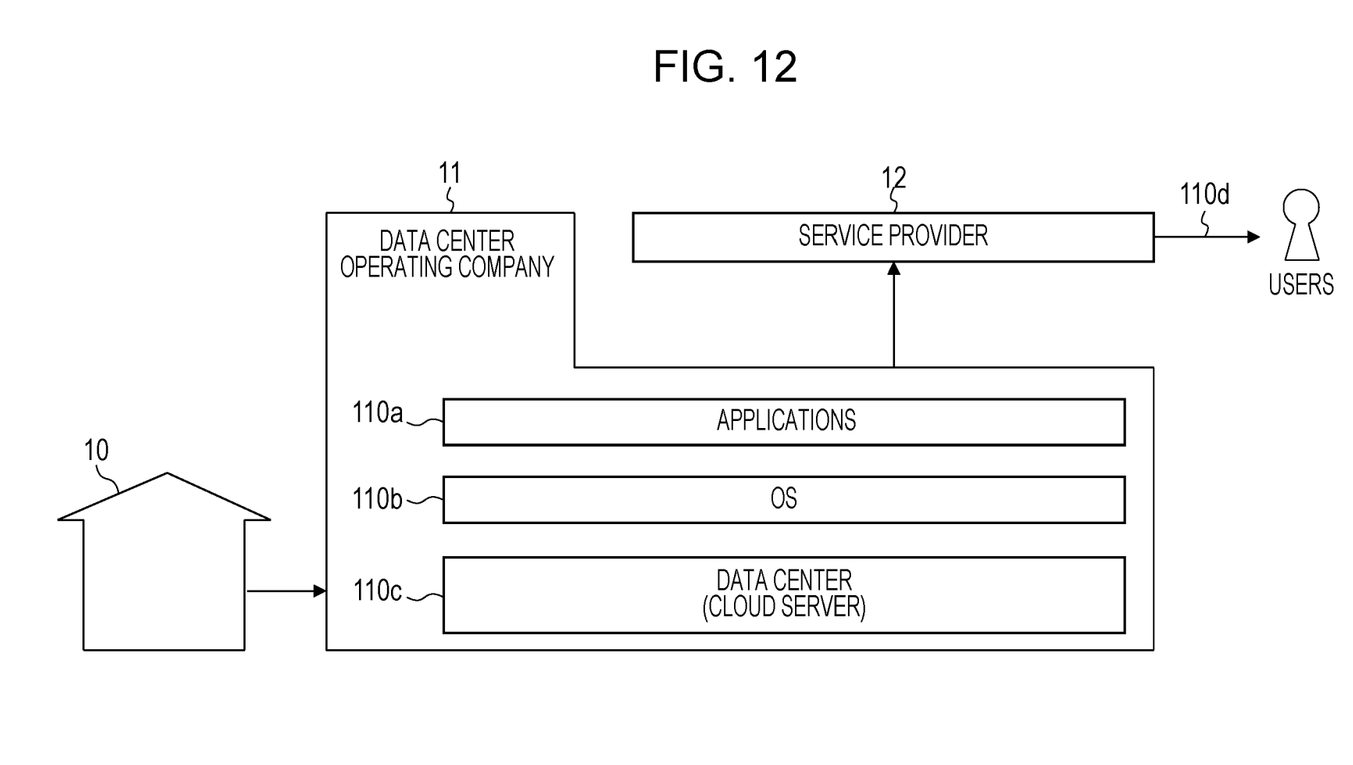
FIG. 12 is a diagram that illustrates a service type 4 (SaaS using type).

FIG. 12 is a diagram that illustrates a service type 4 (SaaS using type). The SaaS is an abbreviation for software as a service. The SaaS is a cloud service delivery model with a function that allows companies and individuals (users) possessing no data center (cloud server) to use applications, provided by a platform provider possessing a data center (cloud server), via a network such as the Internet, for instance.

In the type, the data center operating company 11 manages the applications (110a) and the OS (110b) and operates and manages the data center (cloud server 11a) (110c). The service provider 12 provides the services with use of the OS (110b) and the applications (110a) that are managed by the data center operating company 11 (110d).

In any of the above types, the service provider 12 performs an act of providing the services. The service provider 12 or the data center operating company 11 may develop the OS, the applications, a database for big data, or the like on its own or may contract out those to a third party, for instance.

The public service management method, the public service management apparatus, and the public service management programs according to the disclosure are suited to provide public services to a plurality of users while ensuring fairness among the users.

What is claimed is:

1. A computer implemented method comprising:
  acquiring, using a processor, a degree of congestion comprising information which indicates a ratio of a number of outlets being used by users to a maximum number of outlets in a facility;
  determining, using the processor, whether a value of the degree of congestion is higher than a predetermined value or not; and
  transmitting, using the processor, cessation of use information that urges cessation of use of an outlet to a terminal of a user (i) who uses the outlet and (ii) whose value of a degree of utilization is higher than other users when the value of the degree of congestion is higher than the predetermined value,
  wherein, the acquiring acquires a plurality of address information from the outlets, each of the plurality of address information specifying a seat number of each of the outlets, and
  wherein the transmitting transmits the seat number which is specified by address information of the outlet to the user with the cessation of use information.

2. The computer implemented method according to claim 1, wherein the acquiring acquires a plurality of utilization information, each of which indicates whether each of outlets is used or not, and
  the transmitting transmits (i) utilization information that urges utilization of one of the outlets which is not used based on one of the plurality of utilization information and (ii) the seat number of the one of the outlets which is specified by the one of the address information to a terminal of a user who desires to use one of the outlets.

3. The computer implemented method according to claim 1, wherein the transmitting adjusts a number of destinations to which the cessation of use information is transmitted, in accordance with a number of users, each of who waits for a start of using one of the outlets.

4. The computer implemented method according to claim 1, further comprising:
  calculating, using the processor, the degree of utilization of the one of the outlets by giving a point to a user who uses one of the outlets wherein the transmitting transmits the cessation of use information to the terminal of the user whose value of points is higher than the other users.

5. The computer implemented method according to claim 1, further comprising:

calculating, using the processor, the degree of utilization of the one of the outlets by giving a point to a user who uses the one of the outlets, wherein the transmitting transmits utilization information to the terminal of the user whose value of the point is lower than a value of the point of the user who receives the cessation of use information.

6. The computer implemented method according to claim 1, further comprising:

calculating, using the processor, the degree of utilization of one of the outlets by giving a point to a user who uses the one of the outlets, wherein a value of the point is changed in accordance with a number of users, each of who waits for a start of using the one of the outlets.

7. The computer implemented method according to claim 6, wherein more points are added to the user who uses the one of the outlets when the number of the users, each of who waits for the start of using the one of the outlets is greater than a predetermined value.

8. The computer implemented method according to claim 1, wherein the transmitting transmits identification information of which identifies the user whose value of the degree of utilization is higher than the other users to a terminal of at least one entity associated with managing the outlets.

9. The computer implemented method according to claim 1, further comprising:

calculating, using the processor, the degree of utilization of the one of the outlets by giving a point to the user who uses the one of the outlets; and initializing, using the processor, a value of the point when a predetermined time has lapsed.

10. An apparatus comprising:

a processor; and a non-transitory memory having stored therein instructions which, when executed by the processor, cause the processor to perform operations comprising:

acquiring a degree of congestion comprising information which indicates a ratio of a number of outlets being used by users to a maximum number of outlets in a facility;

determining whether a value of the degree of congestion is higher than a predetermined value or not; and transmitting cessation of use information that urges cessation of use of an outlet to a terminal of a user (i) who uses the outlet and (ii) whose value of a degree of utilization is higher than other users when the value of the degree of congestion is higher than the predetermined value, wherein, the acquiring acquires a plurality of address information from the outlets, each of the plurality of address information specifying a seat number of each of the outlets, and wherein the transmitting transmits the seat number which is specified by address information of the outlet to the user with the cessation of use information.

11. A non-transitory recording medium having stored therein instructions which, when executed by the processor, cause the processor to perform operations comprising:

acquiring a degree of congestion comprising information which indicates a ratio of a number of outlets being used by users to a maximum number of outlets in a facility;

determining whether a value of the degree of congestion is higher than a predetermined value or not; and transmitting cessation of use information that urges cessation of use of an outlet to a terminal of a user (i) who uses the outlet and (ii) whose value of a degree of utilization is higher than other users when the value of the degree of congestion is higher than the predetermined value, wherein, the acquiring acquires a plurality of address information from the outlets, each of the plurality of address information specifying a seat number of each of the outlets, and wherein the transmitting transmits the seat number which is specified by address information of the outlet to the user with the cessation of use information.

* * * * *